United States Patent [19]
Conway et al.

[11] Patent Number: 5,748,916
[45] Date of Patent: May 5, 1998

[54] VXIBUS DEVICE WHICH INTELLIGENTLY MONITORS BUS CONDITIONS AND BEGINS EARLY CYCLES FOR IMPROVED PERFORMANCE

[75] Inventors: Craig M. Conway, Round Rock; Brian Keith Odom, Pflugerville, both of Tex.

[73] Assignee: National Instruments Corporation, Austin, Tex.

[21] Appl. No.: 529,692

[22] Filed: Sep. 18, 1995

[51] Int. Cl.$^6$ ................................................ G06F 13/14
[52] U.S. Cl. ............................ 395/287; 395/280; 395/293
[58] Field of Search ...................................... 395/306, 280, 395/309, 800, 287, 183.04, 650, 293; 340/825.03; 364/200

[56] References Cited

U.S. PATENT DOCUMENTS

| | | |
|---|---|---|
| 4,449,183 | 5/1984 | Flahive et al. |
| 4,602,327 | 7/1986 | LaViolette et al. |
| 5,175,536 | 12/1992 | Aschliman et al. |
| 5,317,737 | 5/1994 | Barton |
| 5,541,862 | 7/1996 | Bright et al. |
| 5,555,425 | 9/1996 | Zeller et al. |

OTHER PUBLICATIONS

Bergey A.L. Jr. and Coale J.L., Method for Decreasing Arbitration Overhead, IBM Technical Disclosure, vol. 26, No. 7A, pp. 3370–3371, Dec. 1983.

VME64 Draft Specification Revision 1.8 Jan. 4, 1994, Chapter 3, "Arbitration Bus".

*Primary Examiner*—Ayaz R. Sheikh
*Assistant Examiner*—Rupal D. Dharia
*Attorney, Agent, or Firm*—Conley, Rose & Tayon; Jeffrey C. Hood

[57] ABSTRACT

A VXI device which intelligently monitors transactions on the VXI bus and begins early cycles on the bus where possible, thereby improving system performance. The VXI Odevice includes a VXI bus master device and a VME bus requester. When the bus master desires the bus, the VXI bus master issues a Device Wants Bus signal to its VME requester directing the requester to gain control of the VXI bus for the device or master. The VME requester then attempts to gain control of the bus for the bus master. According to the present invention, the VME requester also monitors the VXI bus and generates the bus release signal to the master to inform the master whether it is about to lose the bus. The bus release signal provides an indication to the bus master whether the bus master can begin early cycles on the bus. Therefore, the present invention provides improved performance of VXI controllers and devices coupled to the VXI bus. This provides improved performance of instrumentation and test measurement applications, as well as other applications which use a VXI or VME-based bus.

11 Claims, 3 Drawing Sheets

MASTER STATE MACHINE

VXIBUS DEVICE WHICH INTELLIGENTLY MONITORS BUS CONDITIONS AND BEGINS EARLY CYCLES FOR IMPROVED PERFORMANCE

FIELD OF THE INVENTION

The present invention relates to VXI instrumentation systems, and more particularly to a VXI device including a VME bus requester which intelligently monitors the bus and provides a signal to the VXI device to direct the device to begin early cycles where possible.

DESCRIPTION OF THE RELATED ART

The VXI (VME eXtension for Instrumentation) bus is a platform for instrumentation systems that was first introduced in 1987 and was originally designed as an extension of the VME bus standard. The VXI standard has experienced tremendous growth and acceptance around the world and is used in a wide variety of traditional test and measurement and ATE (automated test equipment) applications. The VXI standard uses a mainframe chassis with a plurality of slots to hold modular instruments on plug-in boards. The VXI backplane includes the 32-bit VME computer bus as well as high performance instrumentation buses for precision timing and synchronization between instrument components. Since the VXI bus is based on the VME bus standard, VME modules can also be used in VXI systems.

In order to perform real-time test and measurement operations, it is important that transactions on the VXI bus occur as quickly as possible. Therefore, a system and method for improved performance of VXI controllers and devices coupled to the VXI bus is desired. It is also desirable to improve operations on other VME bus-based systems.

Background on VXI and/or VME bus operations is deemed appropriate. A VXI device includes bus mastering logic for performing cycles on the VXI bus as well as VME requester logic which requests and arbitrates for control of the bus. When the VXI bus master desires the bus, the bus master issues a request signal to its VME requester directing the requester to gain control of the VXI bus for the device or master. When the VME bus requester has gained control of the VXI bus, then the VME requester asserts a grant signal to the VXI master indicating to the master that the master now has control of the bus.

However, once the VXI bus master issues the request signal to the requester, a certain period of time elapses before the requester returns the bus grant signal to the master indicating that the master has control of the bus. During at least a portion of this time, no cycles occur on the bus. It would be highly desirable for a VXI bus master to begin early cycles on the bus where possible to increase system performance.

SUMMARY OF THE INVENTION

The preferred embodiment of the invention comprises a VXI device which intelligently monitors transactions and signals on the VXI bus and begins early cycles on the bus where possible, thereby improving system performance. The VXI device includes a VXI bus master device and a VME bus requester. When the VXI bus master desires the bus, the bus master issues a Device Wants Bus signal to its VME requester directing the requester to gain control of the VXI bus for the device or master. The VME requester then attempts to gain control of the bus. According to the present invention, in certain instances the VME requester also monitors the VXI bus and uses an internal bus release signal to provide an indication to the device whether the device can begin early cycles on the bus.

In the preferred embodiment, the VME requester monitors the VME bus and determines if the bus master is about to lose control of the bus, i.e., if another device of higher priority is requesting the bus. The VME requester communicates this information to the bus master in the form of an early indication signal, preferably the bus release signal. If the bus master will soon lose control of the bus, then the VME bus requester generates the early indication signal to the bus master to indicate that the bus master cannot begin early cycles on the bus. If the early indication signal indicates that other devices are not requesting the bus, then the bus master begins cycles on the VXI bus earlier than would otherwise occur. Thus, when the master asserts the Device Wants Bus signal, if the bus release signal is not asserted or pulsed, then the master presumes that the deassertion of the bus grant signal is not imminent and that it will retain ownership of the bus, and the bus master begins its cycle one clock cycle early.

Therefore, the present invention provides improved performance of VXI controllers and devices coupled to the VXI bus. This provides improved performance of instrumentation and test measurement systems, as well as other systems which use a VXI or VME-based bus.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
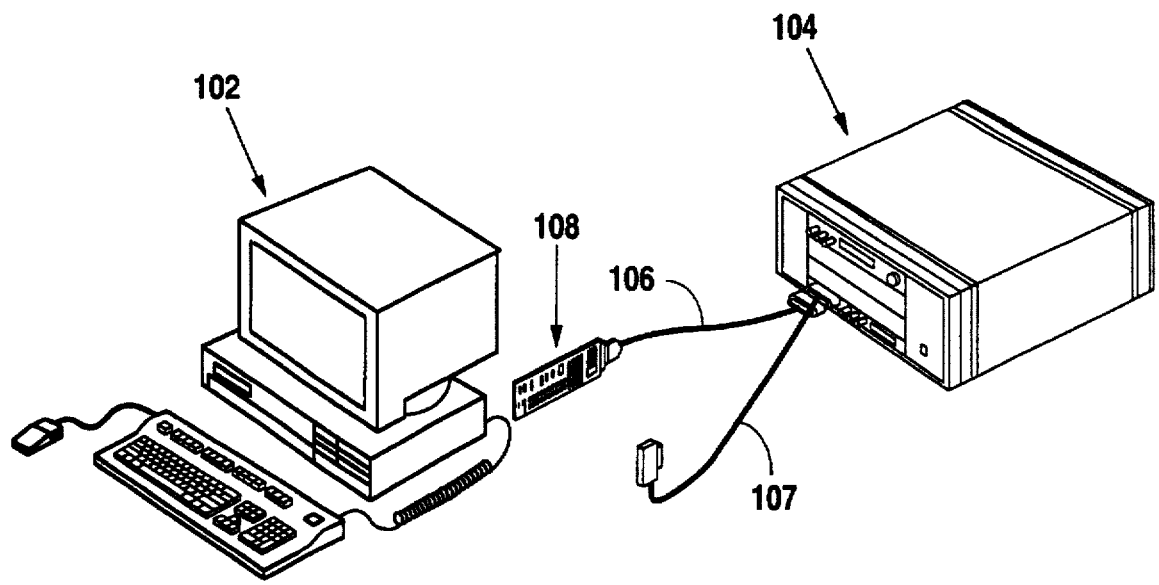
FIG. 1 illustrates an instrumentation system controlled by an external computer.
Figure 2:
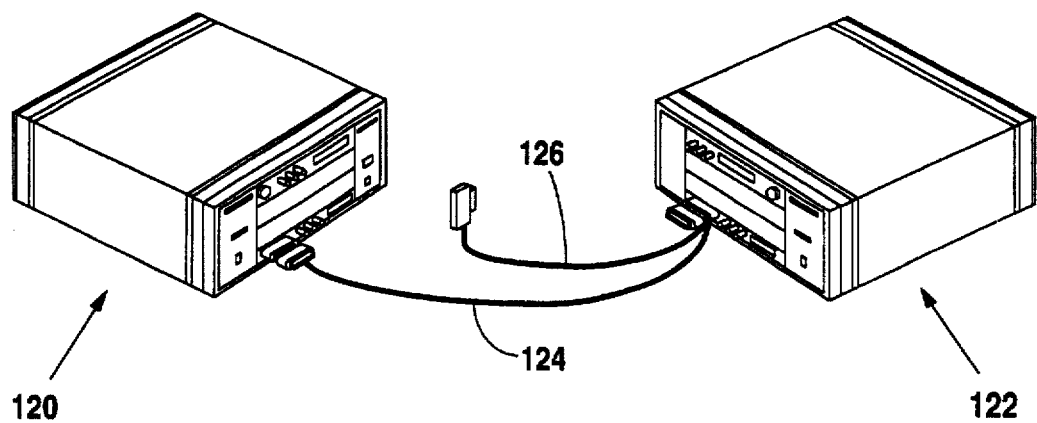
FIG. 2 illustrates an instrumentation system comprising two VXI mainframes controlled by an embedded CPU.

Referring now to FIGS. 1 and 2, instrumentation systems incorporating the system and method of the present invention are shown. As previously discussed, the present invention is preferably incorporated into a VXI instrumentation system. However, it is noted that the present invention may be incorporated into any of various VME bus-based systems, including VME bus systems or VXI systems, as desired. In the present disclosure, the term VME-based bus includes the VME bus as well as all buses that are supersets or based upon the VME bus, including the VXI bus. Also, the systems in FIGS. 1 and 2 are illustrative only, and it is noted that the present invention can be incorporated into various types of instrumentation systems.

The instrumentation system shown in FIG. 1 includes an external computer 102 preferably comprising a system unit, monitor, keyboard, and mouse, as shown. In the embodiment shown in FIG. 1, the external computer 102 includes an expansion bus, preferably based on the industry standard architecture (ISA), also referred to as the AT bus. It is noted that other expansion buses may be used as desired. The external computer 102 includes an interface card referred to as the AT-MXI interface card 108 (shown outside of the external computer for illustrative purposes) which interfaces between the expansion bus in the external computer 102 and a MXI bus implemented on MXI cable 106. The AT-MXI interface card 108 translates between AT bus signals in the external computer 102 and MXI bus signals in the MXI cable 106. The external computer 102 is coupled to a VXI mainframe 104 through the MXI cable 106.

The VXI mainframe 104 includes a first VXI-MXI extender card (230 FIG. 3) which receives MXI signals from the MXI cable 106 and translates these signals into VXI signals which are supplied to the VXI backplane or bus built into the VXI mainframe 104. A plurality of VXI instruments are preferably comprised within the VXI mainframe 104 connected to the VXI backplane. Therefore, the external computer 102 controls VXI instruments in the VXI mainframe 104 by generating signals across the expansion bus through the AT-MXI interface 108, the MXI cable 106, and to the VXI-MXI extender inside the VXI mainframe 104. The VXI-MXI extender converts the respective signals into VXI signals, which are then used to control the VXI instruments. The VXI mainframe 104 may also include a second VXI-MXI extender (230A FIG. 3) which connects to a second MXI cable 107 that is used for connecting to other VXI mainframes. In this manner, a plurality of VXI mainframes 104 can be daisy-chained together to allow the external computer 102 to control a greater number of VXI instruments.

Referring now to FIG. 2, an alternate embodiment of a VXI instrumentation system which implements the system and method of the present invention is shown. In the system shown in FIG. 2, an external computer is not used to control the instrumentation system, but rather a first VXI mainframe 120 includes an embedded CPU resource manager which controls VXI instruments in the first VXI mainframe 120 and also controls VXI instruments in a second VXI mainframe 122. The first VXI mainframe 120 includes a VXI-MXI extender (not shown) which translates VXI signals into MXI signals that are transferred over MXI cable 124 to the second VXI mainframe 122. The second VXI mainframe 122 includes a VXI-MXI extender (not shown) which translates the MXI signals into VXI signals that are provided over the VXI backplane to control the respective VXI instruments in the second VXI mainframe 122. In this manner, the embedded CPU resource manager inside the first VXI mainframe 120 controls VXI instruments in both the first and second VXI mainframes 120 and 122. Also, the second VXI mainframe 122 may include a second VXI-MXI extender (not shown) which connects to an additional MXI cable 126 that can connect to a third VXI mainframe (not shown) as desired. In this manner, several VXI mainframes can be daisy-chained together to allow the embedded CPU resource manager in the first VXI mainframe 120 to control any number of VXI instruments.

Figure 3:
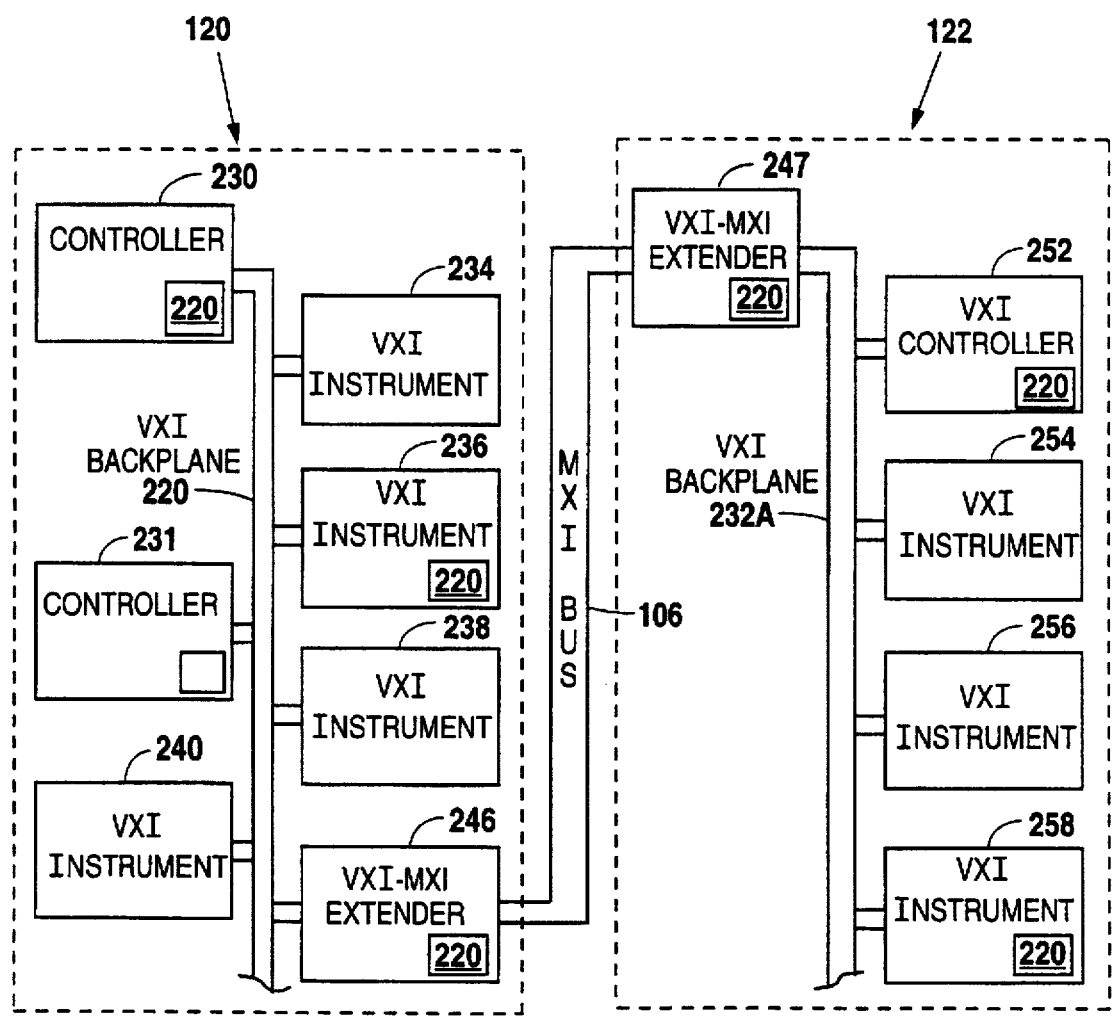
FIG. 3 is a block diagram of the instrumentation system of FIG. 2.

Referring now to FIG. 3, a block diagram illustrating the components comprising the instrumentation system in FIG. 2 is shown. As shown, the VXI mainframe or chassis 120 includes a first controller 230 and a second controller 231. The VXI controllers 230 and 231 are each coupled to a VXI backplane 232. A plurality of VXI instruments 234, 236, 238 and 240 are preferably coupled to the VXI backplane as shown. The controllers 230 and 231 each include VXI interface logic 220 including VME requester logic and VXI bus mastering logic according to the present invention. The VME requester intelligently monitors the VXI bus and indicates to the VXI bus master when the master can begin early cycles on the bus according to the present invention. Thus, the VXI interface logic 220 has increased system performance. One or more of these VXI instruments, such as the VXI instrument 236, may also include VXI interface logic 220 according to the present invention.

In one embodiment of the invention, the VXI mainframe 120 includes a VXI-MXI extender 246 which couples through a MXI cable 106 to a second VXI mainframe 122. The second VXI mainframe 122 includes a second VXI-MXI extender 247 which connects to the MXI bus 106. The VXI-MXI extender 247 connects to a VXI backplane 232A. A VXI controller 252 and a plurality of VXI instruments 254, 256, and 258 are connected to the VXI backplane 232A. The second VXI-MXI extender 247 preferably includes VXI interface logic 220 according to the present invention. One or more of the VXI instruments 254–258, such as the instrument 258, may also include VXI interface logic 220 according to the present invention. It is noted that further VXI mainframes can be daisy-chained in this fashion, as desired.

VXI Device Block Diagram

Figure 4:
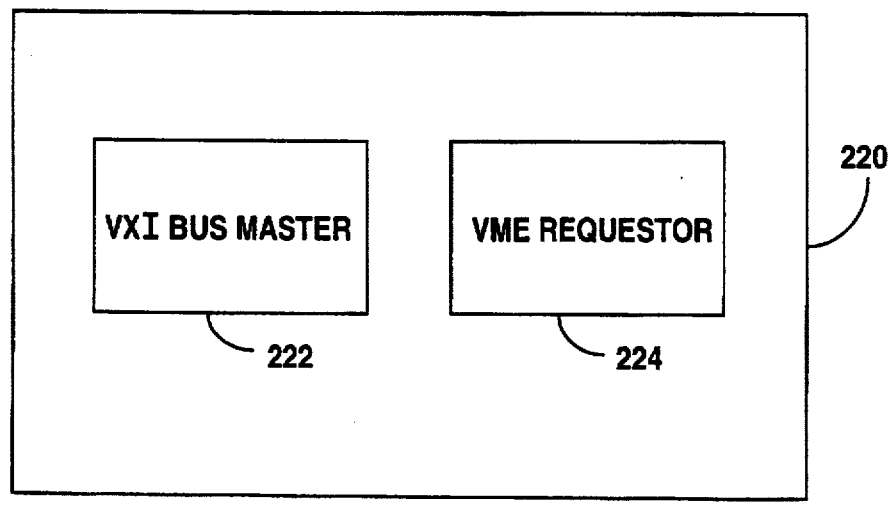
FIG. 4 is a block diagram of a VXI device in the system of FIG. 3 including VXI bus master logic and VME requester logic according to the present invention.

Referring now to FIG. 4, a VXI device according to the preferred embodiment of the invention is shown. As shown the VXI device includes VXI interface logic 220 comprising a VXI bus master 222 and VME requester 224 according to the present invention. In the preferred embodiment, the VXI bus master 222 and the VME requester 224 are comprised in separate chips. In this embodiment, the VXI bus master 222 communicates with the VME requester 224 through internal signals, and the VME requester 224 provides the VME interface to the VXI bus. This reduces the pin count of the VXI bus master 222. In an alternate embodiment, the VXI bus master 222 and the VME requester 224 are comprised as a single logical unit.

It is noted that the VXI bus master 222 can perform various types of functionality. In the preferred embodiment, the VXI master 222 provides an interface between VXI and MXI signals and also acts as a DMA (direct memory access) engine. The requester 224 preferably performs VME requester functions as well as other duties.

VXI Background

As mentioned above, the VXI bus is based on the VME bus standard. The VME bus includes an arbitration mechanism wherein, when two or more devices request use of the data bus simultaneously, the arbitration subsystem detects these requests and grants the bus to one board or device at a time, depending on the scheduling or arbitration algorithm used. The VME bus uses three arbitration algorithms referred to as prioritized, round robin and single level. Prioritized arbitration assigns the bus according to a fixed priority scheme where each of four bus request lines (BR3–BR0) has a priority from highest to lowest.

Round-robin arbitration assigns the bus on a rotating priority basis. When the bus is granted to the requester on bus request line BR(n), then the highest priority for the next arbitration is assigned to the bus request line BR(n-1). Single level arbitration only accepts requests on BR3 and relies on BR3's bus grant daisy chain to arbitrate the requests.

The VME bus includes a plurality of arbitration bus lines comprising six bussed lines and four daisy chained lines. These signals include bus request lines referred to as BRx (BR0–BR3), Bus Grant In lines referred to as BGxIN (BG0IN–BG3IN), and Bus Grant Out lines referred to as BGxOUT (BG0OUT–BG3OUT). Thus the terms BRx, BGxIN and BGxOUT describe the bus request and bus grant lines, where x takes any value from 0 to 3. In the arbitration system, a requester module drives one bus request line (one of BR0 through BR3), one bus grant out line (one of BG0OUT through BG3OUT), and one bus busy line (BBSY). The signals entering each board are the Bus Grant In (BGxIN) lines, while the signals leaving each board are the Bus Grant Out (BGxOUT) lines. If a board or device does not generate bus requests on some bus request levels, then the device propagates the daisy-chain signals for those levels from its BGxIN lines to its respective BGxOUT lines. The lines that leave slot n as BGxOUT enter slot n+1 as BGxIN.

The bus request lines are used by each requester to request use of the data bus. The bus request lines allow the arbiter to award use of the bus by driving a bus grant daisy-chain line low. This low level propagates down the daisy-chain, typically passing through several boards or devices in the process. If a board never uses a particular request/grant level, the signal is passed through that board. Where the board uses a request/grant level x, the corresponding signal BGxIN is gated on board the device. If the on-board requester of the device is currently requesting the data bus on that request/grant level, the requester does not pass the low level of the bus grant daisy-chain line to its BGxOUT line. If the on-board requester is not currently requesting the data bus, then the requester passes on the low level of the bus grant daisy-chain line to the next device in the daisy-chain.

Once a requester has been granted control of the data bus by the bus grant daisy-chain, the requester drives a bus busy signal referred to as BBSY low. The requester then has control of the data bus until it releases the BBSY signal. The release of the BBSY signal allows the arbiter to grant the data bus to another requester.

An arbiter using a prioritized method drives a bus clear line referred to as BCLR low to inform the master currently in control of the data bus when a higher priority request is pending. The current master can then continue transferring data until an appropriate stopping point, and then the bus master allows its on-board requester to release the BBSY signal.

For more information on the VME and VXI bus standards, please see *The VME bus Handbook* by Wade Peterson, published by the VFEA International Trade Association, 10229 N. Scottsdale Rd., Suite B, Scottsdale, Ariz. 85253, which is hereby incorporated by reference. Please also see *IEEE Standard for a Versatile Backplane Bus: VME bus*, published by the IEEE, which is also hereby incorporated by reference.

VXI Device Internal Signals

In the preferred embodiment of the invention, the VXI device utilizes a plurality of internal signals. In particular, the VXI bus master logic 222 and the VME requester 224 communicate using internal signals referred to as a Device Wants Bus (DWB) signal, a Device Granted Bus (DGB) signal, and a Bus Release (BRLS) signal. The VXI bus master 222, referred to herein as the bus master or master, issues the Device Wants Bus signal to its VME requester 224 directing the requester 224 to gain control of the VXI bus for the device or master 222. When the VME bus requester 224 has gained control of the VXI bus, then the VME requester 224 asserts the Device Granted Bus signal to the VXI master indicating to the master 222 that the master 222 now has control of the bus. However, as noted in the background section, in prior art systems once the VXI bus master issues the Device Wants Bus signal, a certain period of time elapses before the requester returns the bus grant signal to the master indicating to the master that the master has control of the bus. During at least a portion of this period of time, no cycles occur on the bus.

Once the VME requester 224 asserts the Device Grants Bus signal to the VXI master, the VME requester 224 then drives the BBSY signal onto the VXI bus, and the master performs any number of desired accesses on the VXI bus. When the VXI master completes operations on the VXI bus, the VXI master 222 releases or deasserts the Device Wants Bus signal to the VME requester 224.

If another device of higher priority requires use of the bus during any portion of the master's cycle, the VME requester detects this event. The VME requester uses the bus release BRLS signal to inform the VXI master that another VXI device desires control of the bus that is of higher priority and that the master should get off the bus as soon as possible.

VXI Device Operation—Present Invention

According to the present invention, where a master owns the bus, releases its DWB signal, and then desires ownership again, the VME requester 224 monitors the VXI bus and asserts the internal bus release signal BRLS to the master 222 to inform the master 222 that it is about to lose the bus. The VXI bus master 222 uses this information to determine whether it should begin an early cycle.

According to the invention, when the master 222 has completed VXI bus operations and desires to regain control of the bus, the master 222 asserts the Device Wants Bus (DWB) signal to the VME requester 224. The VME requester 224 may still own the VXI bus but must determine if another device will gain control of the bus. If the VME requester 224 determines that another device will gain control of the bus, then the VME requester 224 asserts the bus release signal to the master 222 to inform the master 222 that the master 222 will soon lose control of the bus. If the VME requester 224 determines that it will not lose the bus, i.e., another device will not gain control of the bus, then the VME requester 224 does not assert the bus release signal to the master 222 as an indication that it will lose the bus. However, the VME requester 224 may still assert the bus release signal for other reasons.

When the master reasserts the Device Wants Bus signal, the master 222 determines if the bus release signal is asserted. If the master 222 does not detect the bus release signal as it asserts DWB, then the master begins its cycle in the state it asserts DWB, rather than waiting one state to detect the signal. Thus, according to the invention, if the master 222 does not detect the bus release signal asserted while issuing a Device Wants Bus signal, the master 222 presumes that the bus grant signal will not deassert and begins operations immediately. If the master 222 detects the bus release signal asserted, then the master 222 does not begin a cycle, but rather knows that it will soon lose control of the bus.

State Transition Diagram

Figure 5:
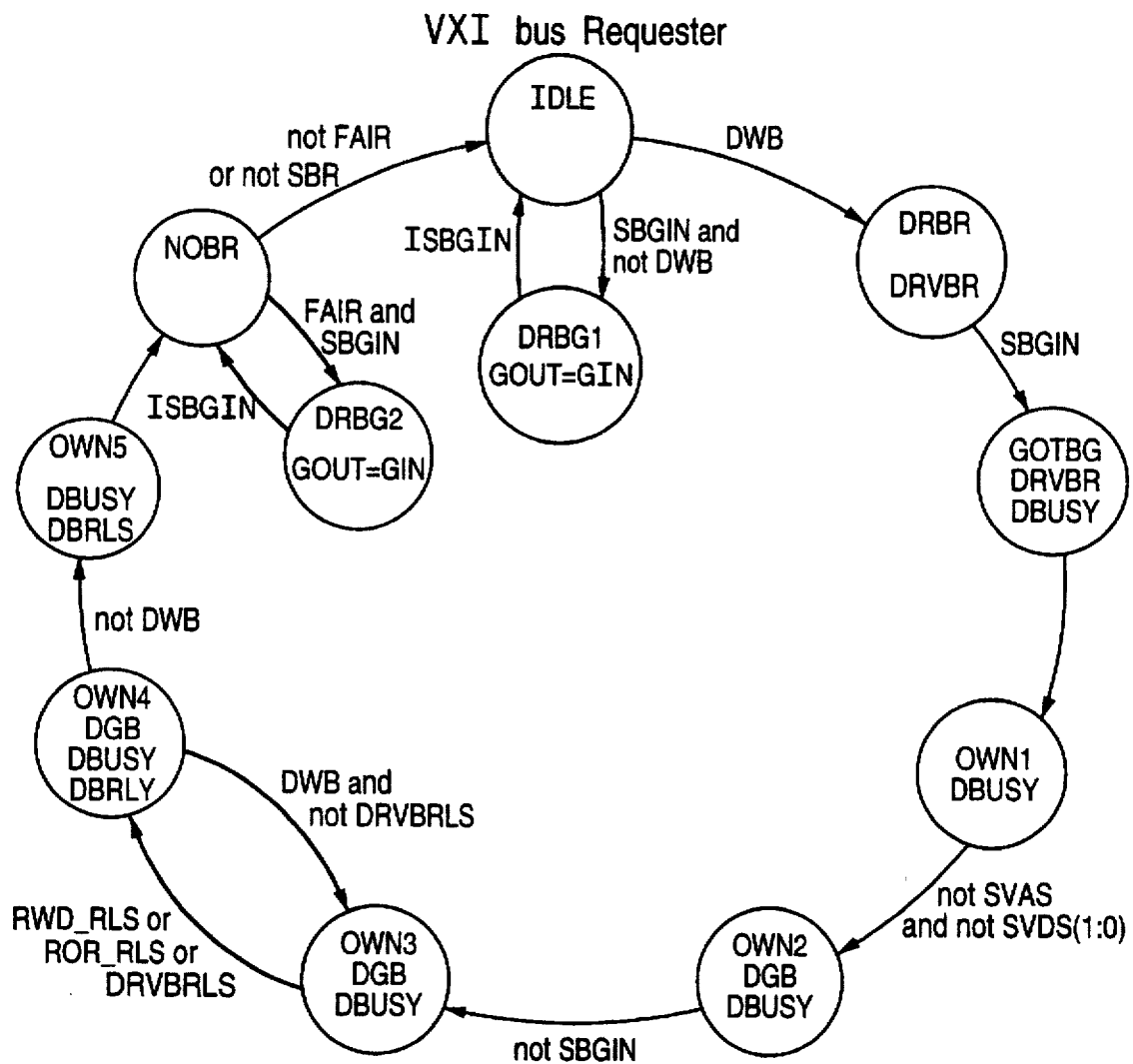
FIG. 5 is a state transition diagram illustrating operation of the VME requester logic in the block diagram of FIG. 4.
Figure 6:
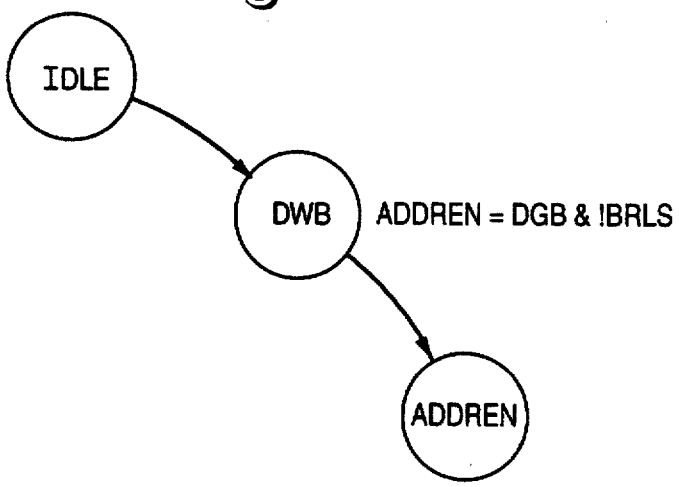
FIG. 6 is a state transition diagram illustrating operation of the VME master in the block diagram of FIG. 4.

Referring now to FIG. 5, a state transition diagram illustrating operation of the VME requester 224 according to the preferred embodiment of the invention is shown. The VME requester 224 begins operation in a state referred to as IDLE. When the Device Wants Bus (DWB) signal is asserted, the VME requester 224 enters a state referred to as drive bus request (DRBR). In the DRBR state the Drive Bus Request (DRVBR) signal is asserted, which asserts the appropriate bus request signal on the VXI bus. The VME requester 224 transitions from the DRBR state to a state referred to as GOTBG (Got Bus Grant) when a synchronous bus grant in (SBGIN) signal is received. The SBGIN signal indicates that the respective bus grant in signal BGxIN has been asserted. On the VME bus when a bus request is asserted (BRx), a daisy chain starts along the bus from module to module. The daisy chain begins at the first board that is requesting at that particular level, and the SBGIN signal indicates that the bus grant signal has been placed in the daisy chain and thus the VME requester 224 should transition to its next state.

The GOTBG state indicates that the requester 224 has received the bus grant. In the GOTBG state the DRVBR signal remains asserted and the DBUSY signal is asserted. The DBUSY signal is an internal signal directing the output drivers to assert the VME bus signal BBSY. The DRVBR (Drive Bus Request) signal remains asserted to indicate that this respective VXI device is still requesting the bus.

On the next clock cycle, the VME requester 224 transitions from the GOTBG state to the OWN1 state. The OWN1 state is the first state where the requester has ownership of the bus. In this state, the DBUSY signal is still asserted to indicate that the VXI bus master 222 has control of the bus. When the equation:

$$\text{not SVAS and not SVDS(1:0)}$$

is true, the state machine transitions from the OWN1 state to a state referred to as OWN2. The SVAS signal is the synchronous VXI address strobe signal and the SVDS(1:0) signals are the synchronous VXI data strobe signals 1 and 0. A VXI bus master cannot perform any operations on the bus until the address strobe and the data strobe signals are no longer asserted on the bus.

In the OWN2 state, the Device Grants Bus (DGB) signal is asserted by the VME requester 224 to the VXI bus master 222 to inform the VXI bus master 222 that the master 222 has control of the bus. The DGB signal informs the VXI bus master 222 that the master 222 can begin a cycle and turn its transceivers outwards in order to present an address onto the VXI bus. When the SBGIN (synchronous bus grant in) signal is deasserted, the state machine transitions from the OWN2 state to a state referred to as OWN3 state. In the OWN3 state, the device DGB (Device Grants Bus) remains asserted and the DBUSY signal also remains asserted.

The state machine transitions from the OWN3 state to a state referred to as OWN4 when the condition:

RWD_RLS or ROR_RLS or DRVBRLS is true. The conditions RWD_RLS, ROR_RLS and DRVBRLS are as follows:

RWD_RLS=not DWB and not ROR
ROR_RLS=not DWB and ANYBR
DRVBRLS=RLSEN and ((ANYBR and DOBR) or (BCLR and not DOBR))

The RWD_RLS condition is true when the VME requester 224 is configured to release the bus when done, i.e., is not configured to release the bus on request (ROR), and the DWB signal is negated. The ROR_RLS condition is true when the VME requester 224 is configured to release the bus on request, signified by the ANYBR (any bus request) condition being true, and the DWB signal is negated. When the VXI device is configured as a release on request device, then once the VXI device acquires the VXIbus, the device does not relinquish the bus until another device requests the bus, typically a request at the same request level. The DRVBRLS condition is true when the release enable (RLSEN) signal is true and either another device is requesting the bus and the drive on bus release (DOBR) condition is true, or the BCLR signal is asserted and the DOBR condition is false. Thus the state machine transitions from the OWN3 state to the OWN4 state when the bus master 222 no longer requires control of the bus or the bus release signal DRVBRLS is asserted. If the requester 224 is configured as a release on request requester, then the requester 224 only transitions from OWN3 to OWN4 if the ANYBR condition is true.

In the OWN3 state, if the bus master releases the DWB signal, and if the requester is configured as a release on request device, then the requester will remain in the OWN3 state until another device requests the bus, signified by the ANYBR condition being true. If the bus master reasserts the DWB signal indicating a desire to regain control of the bus, then according to the present invention the bus master immediately begins cycles on the bus since the DBRLS signal is false. If the requester reasserts the DWB signal and at the same time another requester requests control of the bus, then the requester will transition from the OWN3 state to the OWN4 state and immediately return back to the OWN3 state; however, the bus master will immediately be able to begin a cycle because DBRLS was false at the time it asserted DWB.

Thus, when the master 222 asserts the Device Wants Bus (DWB) signal in the OWN3 state, the master 222 sees that the bus release signal BRLS is not asserted and determines that it can immediately begin new cycles. If the master asserts DWB and another device has requested the bus in the previous cycle, the requester will have transitioned from OWN3 to OWN4. The master will see BRLS in the state it asserts DWB and must wait 1 clock cycle before sampling DGB rather than starting. The transition from OWN4 back to OWN3 is signified by the equation:

$$\text{DWB and not DRVBRLS}$$

being true. Thus, according to the invention, if the master 222 has just completed operations on the bus and desires to regain control of the bus, if the master 222 does not detect the bus release signal asserted when reasserting the DWB signal, the master 222 presumes that the bus grant signal will not deassert and begins operations immediately. If the master 222 detects the bus release signal pulsed or asserted, then the master 222 does not begin a cycle, but rather knows that it will soon lose control of the bus. This allows more efficient operations in a VME-based system.

In the OWN4 state the Device Grants Bus (DGB) signal and the DBUSY signal remain asserted and a signal referred to as DBRLS (drive bus release) is asserted to release control of the bus. The requestor 224 transitions to the OWN5 state on the next clock cycle if the master is not requesting the bus. If the requester reaches the OWN4 state due to the DRVBRLS condition being true, the requester remains in the OWN4 state (as long as the master still requests the bus).

Here it is noted that the BRLS signal in prior art systems only informs the respective VXI bus master 222 to get off the bus. According to the present invention the DBRLS signal serves this purpose and also indicates whether the bus master 222 can begin an early cycle, as described above.

The state machine transitions from the OWN4 state to a state referred to as OWN5 when the DWB signal is negated. In this instance, the VXI bus master 222 no longer requires use of the bus.

In the OWN5 state, the DBUSY signal is asserted and the DBRLS (drive bus release) signal is asserted. The state machine then transitions from the OWN5 state to a state referred to as NOBR (No Bus Request). In the NOBR state, the VME requester 224 cannot assert a bus request signal. In this embodiment, the VME requester 224 is designed as a "fair" requester, meaning that once the requester 224 has requested the bus, the requester 224 is not permitted to request the bus again until all other VXI devices on the VXI bus have had the possibility to request the bus. Therefore, the VME requester 224 waits in the NOBR state until the FAIR signal is disabled or nobody is requesting the bus.

The state machine transitions from the NOBR state to a state referred to as DRBG2 when the FAIR signal is true and the SBGIN signal is true, indicating another requester is receiving the bus grant daisy chain in response to a request. The VME requester 224 remains in the DRBG2 state until the grant is removed. In the DRBG2 state, the GOUT signal equals GIN, i.e., the bus grant out signal equals the bus grant in signal. The state machine returns from the DRBG2 state to the NOBR state when SBGIN is negated. The state machine transitions from the NOBR state to the IDLE state when the equation:

not FAIR or not SBR is true. This transition occurs when the requester 224 is not a fair requester or a system bus request is not occurring.

The VME requester 224 transitions from the IDLE state to a state referred to as DRBGI when the requester 224 receives the SBGIN signal and the respective VME requester 224 is not requesting the bus. In this instance, the VME requester 224 passes the grant to the next device so that the next device can receive the bus grant in (GIN) signal. The VME requester 224 returns from the DRBGI state to the idle state when the system SBGIN signal is negated.

In either the DRBG1 state or the DRBG2 state, the VME requester 224 is waiting and not requesting control of the bus, but passes the grant daisy chain if another device requests control of the bus.

Conclusion

Therefore, the present invention comprises a VME bus device including a VME requester and a VME (or VXI) bus master which has increased performance. When the bus master has had control of the bus and desires to regain control of the bus, the bus master asserts the Device Wants Bus (DWB) signal. During this time the VME requester monitors the VME (or VXI) bus, determines if the bus master will gain control of the bus, and asserts the bus release signal accordingly. The bus master monitors the bus release signal from the VME requester to determine if it can begin an early cycle according to the present invention.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A device adapted for coupling to a VME-based bus which begins early cycles on the VME-based bus for increased system performance, comprising:

a bus master adapted for coupling to said VME-based bus which asserts a signal to request control of the VME-based bus;

a VME requester coupled to the bus master and adapted for coupling to the VME-based bus which receives said signal from the bus master requesting control of the VME-based bus and gains control of the VME-based bus for the bus master in response to said signal requesting control of the VME-based bus, wherein said VME requester includes:

means for monitoring the bus to determine if said bus master is about to lose control of the bus;

means, coupled to said means for monitoring, for generating an early indication signal to said bus master to indicate whether said bus master is about to lose control of the VME-based bus; and wherein said bus master includes means for determining if said early indication signal has been generated;

wherein said bus master begins a cycle on a first clock cycle if said early indication signal indicates that said bus master is not about to lose control of the bus, wherein said bus master begins a cycle on a later clock cycle than said first clock cycle if said early indication signal indicates that said bus master is about to lose control of the bus.

2. The device of claim 1, wherein said early indication signal is a bus release signal.

3. The device of claim 1, wherein said means for generating said early indication signal and said means for determining if said early indication signal has been generated operate only after said bus master has had control of the bus and has indicated that the bus is available and then desires to regain control of the bus.

4. The device of claim 1, wherein said VME-based bus is the VXI bus, and the bus master and the requester are adapted for coupling to the VXI bus.

5. A VXI device adapted for coupling to a VXI bus which begins early cycles on the VXI bus for increased system performance, comprising:

a VXI bus master adapted for coupling to the VXI bus which asserts a Device Wants Bus signal to request control of the VXI bus;

a requester coupled to the VXI bus master and adapted for coupling to the VXI bus which receives said Device Wants Bus signal and gains control of the VXI bus for the VXI bus master in response to said Device Wants Bus signal, wherein said requester includes:

means for monitoring the VXI bus to determine if said VXI bus master is about to lose control of the bus;

means, coupled to said means for monitoring, for generating an early indication signal to said VXI bus master to indicate whether said VXI bus master is about to lose control of the bus; and means for asserting a bus grant signal to said VXI bus master to indicate to said VXI bus master that said VXI bus master has control of the bus;

wherein said VXI bus master includes means for determining if said early indication signal has been generated; and wherein said VXI bus master begins a cycle on a first clock cycle if said early indication signal indicates that said VXI bus master is not about to lose control of the bus, wherein said VXI bus master begins a cycle on a later clock cycle than said first clock cycle if said early indication signal indicates that said bus master is about to lose control of the bus.

6. The VXI device of claim 5, wherein said early indication signal is a bus release signal.

7. The device of claim 5, wherein said means for generating said early indication signal and said means for determining if said early indication signal has been generated operate only after said VXI bus master has had control of the bus and has indicated that the bus is available for other devices and then desires to regain control of the bus.

8. A method for beginning early cycles on a VXI bus for increased system performance in an instrumentation system comprising a VXI bus and a VXI device coupled to the VXI bus, wherein the VXI device includes a bus master and a VME requester coupled to the bus master, the method comprising:

the bus master asserting a signal to the requester to request control of the VXI bus;

the requester receiving said signal requesting control of the VXI bus;

the requester attempting to gain control of the VXI bus for the bus master in response to said signal requesting control of the VXI bus;

the requester monitoring the VXI bus to determine if said bus master is about to lose control of the bus;

the requester generating an early indication signal to said bus master to indicate whether said bus master is about to lose control of the bus;

the bus master determining if said early indication signal has been generated;

the bus master beginning a cycle on a first clock cycle if said early indication signal indicates that said bus master is not about to lose control of the bus;

the bus master beginning a cycle on a later clock cycle than said first clock cycle if said early indication signal indicates that said bus master is about to lose control of the bus.

9. The method of claim 8, wherein said early indication signal is a bus release signal.

10. The method of claim 8, further comprising:

the bus master performing a data transfer on the VXI bus prior to said step of the bus master asserting said signal to the requester to request control of the VXI bus.

the bus master discontinuing use of the VXI bus prior to said step of the bus master asserting said signal to the requester to request control of the VXI bus.

11. The method of claim 8, wherein said signal requesting control of the VXI bus is a device wants bus signal.

* * * * *